US011042373B2

(12) United States Patent
Bainville et al.

(10) Patent No.: US 11,042,373 B2
(45) Date of Patent: *Jun. 22, 2021

(54) COMPUTATION ENGINE THAT OPERATES IN MATRIX AND VECTOR MODES

(71) Applicant: Apple Inc., Cupertino, CA (US)

(72) Inventors: Eric Bainville, Sunnyvale, CA (US); Jeffry E. Gonion, Campbell, CA (US); Ali Sazegari, Los Altos, CA (US); Gerard R. Williams, III, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/928,752

(22) Filed: Jul. 14, 2020

(65) Prior Publication Data

US 2020/0348934 A1 Nov. 5, 2020

Related U.S. Application Data

(63) Continuation of application No. 16/043,772, filed on Jul. 24, 2018, now Pat. No. 10,754,649.

(51) Int. Cl.
*G06F 9/30* (2018.01)
*G06F 17/16* (2006.01)

(52) U.S. Cl.
CPC ...... *G06F 9/30036* (2013.01); *G06F 9/30018* (2013.01); *G06F 17/16* (2013.01)

(58) Field of Classification Search
None
See application file for complete search history.

(56) References Cited

U.S. PATENT DOCUMENTS

| 4,719,588 A | 1/1988 | Tatemichi et al. |
| 5,025,407 A | 6/1991 | Gulley et al. |

(Continued)

FOREIGN PATENT DOCUMENTS

| CN | 106445471 | 2/2017 |
| EP | 1365319 A1 | 11/2003 |

(Continued)

OTHER PUBLICATIONS

'FPGA Implementation and Evaluation of a Simple Processor for Multi-scalar/Vector/Matrix Instructions' by Soliman and Elsayed, copyright 2014, IEEE. (Year: 2014).*

(Continued)

*Primary Examiner* — Steven G Snyder
(74) *Attorney, Agent, or Firm* — Kowert, Hood, Munyon, Rankin & Goetzel, P.C.; Lawrence J. Merkel

(57) ABSTRACT

In an embodiment, a computation engine is configured to perform vector multiplications, producing either vector results or outer product (matrix) results. The instructions provided to the computation engine specify a matrix mode or a vector mode for the instructions. The computation engine performs the specified operation. The computation engine may perform numerous computations in parallel, in an embodiment. In an embodiment, the instructions may also specify an offset with the input memories, providing additional flexibility in the location of operands. More particularly, the computation engine may be configured to perform numerous multiplication operations in parallel and to accumulate results in a result memory, performing multiply-accumulate operations for each matrix/vector element in the targeted locations of the output memory.

20 Claims, 7 Drawing Sheets

(56) References Cited

U.S. PATENT DOCUMENTS

| | | |
|---|---|---|
| 5,107,452 A | 4/1992 | Karmarkar |
| 5,576,982 A | 11/1996 | Wu |
| 5,852,444 A | 12/1998 | Lippincott |
| 5,903,769 A | 5/1999 | Arya |
| 6,675,187 B1 | 1/2004 | Greenberger |
| 6,901,422 B1 | 5/2005 | Sazegari |
| 6,922,716 B2 | 7/2005 | Desai et al. |
| 6,959,378 B2 | 10/2005 | Nickolls et al. |
| 7,430,577 B2 | 9/2008 | Buchert et al. |
| 7,664,930 B2 | 2/2010 | Paver et al. |
| 7,668,894 B2 | 2/2010 | Sazegari et al. |
| 7,814,297 B2 | 10/2010 | Wezelenburg |
| 7,844,352 B2 | 11/2010 | Vouzis |
| 7,873,812 B1 | 1/2011 | Mimar |
| 8,250,130 B2 | 8/2012 | Brokenshire et al. |
| 8,458,442 B2 | 6/2013 | Eichenberger |
| 8,577,950 B2 | 11/2013 | Eichenberger et al. |
| 8,650,240 B2 | 2/2014 | Eichenberger |
| 8,984,043 B2 | 3/2015 | Ginzburg |
| 9,361,065 B2 | 6/2016 | Ajima |
| 9,600,281 B2 | 3/2017 | Eichenberger |
| 9,658,986 B2 | 5/2017 | Ge et al. |
| 10,089,278 B2 | 10/2018 | Moskovich et al. |
| 10,338,919 B2 | 7/2019 | Boswell |
| 10,346,163 B2 | 7/2019 | Bainville et al. |
| 10,489,479 B1 | 11/2019 | Shalev |
| 10,489,482 B1 | 11/2019 | Graves |
| 10,831,488 B1 | 11/2020 | Bainville et al. |
| 10,877,754 B2 | 12/2020 | Bainville et al. |
| 2003/0188127 A1 | 10/2003 | So |
| 2003/0221086 A1 | 11/2003 | Simovich et al. |
| 2005/0125631 A1 | 6/2005 | Symes et al. |
| 2005/0197977 A1 | 9/2005 | Buck |
| 2005/0203980 A1 | 9/2005 | Harrison et al. |
| 2005/0225562 A1 | 10/2005 | Higgins et al. |
| 2007/0028076 A1 | 2/2007 | Wezelenburg |
| 2009/0024685 A1 | 1/2009 | Salama et al. |
| 2009/0030960 A1 | 1/2009 | Geraghty |
| 2009/0100247 A1 | 4/2009 | Moyer et al. |
| 2010/0274990 A1 | 10/2010 | Wilder |
| 2011/0040821 A1 | 2/2011 | Eichenberger |
| 2011/0040822 A1 | 2/2011 | Eichenberger |
| 2011/0055517 A1 | 3/2011 | Eichenberger et al. |
| 2011/0153707 A1 | 6/2011 | Ginzburg et al. |
| 2012/0254591 A1 | 10/2012 | Hughes et al. |
| 2012/0254592 A1 | 10/2012 | San Adrian et al. |
| 2013/0159665 A1 | 6/2013 | Kashyap |
| 2013/0198495 A1 | 8/2013 | Vick et al. |
| 2014/0019720 A1 | 1/2014 | Sprangle et al. |
| 2015/0012724 A1 | 1/2015 | Lutz et al. |
| 2016/0020871 A1 | 1/2016 | Elezabi |
| 2017/0031682 A1 | 2/2017 | Eapen et al. |
| 2017/0097884 A1 | 4/2017 | Werner et al. |
| 2017/0102892 A1 | 4/2017 | Pusukuri et al. |
| 2017/0192781 A1 | 7/2017 | Valentine et al. |
| 2018/0032312 A1 | 2/2018 | Hansen et al. |
| 2018/0074824 A1 | 3/2018 | Sazegari et al. |
| 2018/0107630 A1 | 4/2018 | Zhou et al. |
| 2018/0137075 A1 | 5/2018 | Linderman et al. |
| 2018/0197067 A1 | 7/2018 | Mody |
| 2018/0321937 A1 | 11/2018 | Brown et al. |
| 2018/0357064 A1 | 12/2018 | Chen et al. |
| 2019/0065150 A1 | 2/2019 | Heddes et al. |
| 2019/0065190 A1 | 2/2019 | Zhang et al. |
| 2019/0079903 A1 | 3/2019 | Dreyer et al. |
| 2019/0102178 A1 | 4/2019 | Zbiciak |
| 2019/0171448 A1 | 6/2019 | Chen |
| 2020/0034145 A1 | 1/2020 | Bainville et al. |

FOREIGN PATENT DOCUMENTS

| | | |
|---|---|---|
| EP | 3051412 A1 | 8/2016 |
| WO | 9110963 A1 | 7/1991 |
| WO | 2017185389 A1 | 11/2017 |

OTHER PUBLICATIONS

Shaoli Liu et al., "Cambricon," ACM Sigarch Computer Architecture News, ACM Special Interest Group on Computer Architecture, 2 Penn Plaza, Suite 701 New York, NY 10121-0701 USA, vol. 44, No. 3, Jun. 18, 2016 (2016-06-180, pp. 393-405, XP058300636, ISSN:0163-5964, DOI: 10:1145/3007787.3001179.

Mostafa I Soliman Ed—Anonymous: "Mat-core: A matrix core extension for general purpose processors," Computer Engineering & Systems, 2007; IEEE, PI, Nov. 1, 2007 (Nov. 1, 2007), pp. 304-310, XP031212365, ISBN: 978-1-4244-1365-2.

ISR/WO, PCT/US2017/048453, dated Nov. 16, 2017, 16 pages.

Tang et al., "Table-Lookup Algorithms for Elementary Functions and Their Error Analysis", 1991, pp. 232-236.

Kantabutra, "On Hardware for Computing Exponential and Trigonometric Functions", Mar. 1996, pp. 328-339.

Song Han et al: EIE: Efficient Interence Engine on Compressed Deep Neural Networks, ACM Sigarch Computer Architecture News, ACM Special Interset Group on Computer Archtecture, 2 Penn Plaza, Suite 701 New York NY 10121-0701 USA, Stanford University, 2016, 12 pages.

ISR/WO, PCT/US2019/042744, dated Oct. 23, 2019, 15 pages.

IPRP, PCT/US2019/042744, dated Feb. 4, 2021, 11 pages.

\* cited by examiner

| | $X_0$ | $X_1$ | ... | $X_M$ |
|---|---|---|---|---|
| $Y_0$ | $Z_{00}$ += $X_0Y_0$ | $Z_{10}$ += $X_1Y_0$ | ... | $Z_{M0}$ += $X_MY_0$ |
| $Y_1$ | $Z_{01}$ += $X_0Y_1$ | $Z_{11}$ += $X_1Y_1$ | ... | $Z_{M1}$ += $X_MY_1$ |
| ⋮ | | | ⋮ | |
| $Y_M$ | $Z_{0M}$ += $X_0Y_M$ | $Z_{1M}$ += $X_1Y_M$ | ... | $Z_{MM}$ += $X_MY_M$ |

Fig. 3

| | $X_0$ | $X_1$ | ... | $X_M$ |
|---|---|---|---|---|
| $Y_0$ | $Z_{00}\mathrel{+}= X_0 Y_0$ | $Z_{10}\mathrel{+}= X_1 Y_0$ | ... | $Z_{M0}\mathrel{+}= X_M Y_0$ |
| $Y_1$ | $Z_{01}\mathrel{+}= X_0 Y_1$ | $Z_{11}\mathrel{+}= X_1 Y_1$ | ... | $Z_{M1}\mathrel{+}= X_M Y_1$ |
| ⋮ | | | ⋮ | |
| $Y_M$ | $Z_{0M}\mathrel{+}= X_0 Y_M$ | $Z_{1M}\mathrel{+}= X_1 Y_M$ | ... | $Z_{MM}\mathrel{+}= X_M Y_M$ |

| | $X_0$ | ... | $X_N$ |
|---|---|---|---|
| $Y_0$ | $Z_{00}\mathrel{+}= X_0 Y_0$ | ... | $Z_{M0}\mathrel{+}= X_M Y_0$ |
| | Not used | | |
| ⋮ | | ⋮ | |
| $Y_N$ | $Z_{0M}\mathrel{+}= X_0 Y_N$ | ... | $Z_{NN}\mathrel{+}= X_N Y_N$ |
| | Not used | | |

$N = \text{int}(M/2) + 1$

Fig. 4

| Instruction | Description |
|---|---|
| LoadX Xn | Load X memory from main memory at pointer Xn |
| LoadY Xn | Load Y memory from main memory at pointer Xn |
| LoadZ<sz> Xn | Load Z memory from main memory at pointer Xn. Depending on size, loads a portion or all of Z memory. |
| StoreX Xn | Store X memory to main memory at pointer Xn |
| StoreY Xn | Store Y memory to main memory at pointer Xn |
| StoreZ<sz> Xn | Store Z memory to main memory at pointer Xn. Depending on size, stores a portion or all of Z memory. |
| MAC/FMA/FMS <size> <V/M> <X RA> <X Offset> <Y RA> <Y Offset> <Z RA> [Mask] | Compute multiplications of X and Y, sum with elements of Z. Size indicates output size. V/M specifies Vector or Matrix (Outer Product) Multiplication. If Mask is specified, limit computations to non-masked elements. |

COMPUTATION ENGINE THAT OPERATES IN MATRIX AND VECTOR MODES

This application is a continuation of U.S. patent application Ser. No. 16/043,772, file on Jul. 24, 2018. The above application is incorporated herein by reference in its entirety.

BACKGROUND

Technical Field

Embodiments described herein are related to circuitry to perform matrix and vector operations in processor-based systems.

Description of the Related Art

A variety of workloads being performed in modern computing systems rely on massive amounts of vector multiplications. For example, certain long short term memory (LSTM) learning algorithms are used in a variety of contexts such as language detection, card readers, natural language processing, and handwriting processing, among other things. LSTM processing includes numerous vector multiplications. The multiplications may be small integers or floating point numbers, for example, but very large numbers of them. Additionally, many of these workloads make significant use of outer product operations. The outer product operation is the matrix result of two input vectors (X and Y), where each element (i, j) of the matrix is the product of element i of the vector X and element j of the vector Y: $M_{ij}=X_iY_j$. The performance of such operations on a general purpose central processing unit (CPU), even a CPU with vector instructions, is very low; while the power consumption is very high. Low performance, high power workloads are problematic for any computing system, but are especially problematic for battery-powered systems.

SUMMARY

In an embodiment, a computation engine is configured to perform vector multiplications, producing either vector results or outer product (matrix) results. The instructions provided to the computation engine specify a matrix mode or a vector mode for the instructions. The computation engine performs the specified operation. The computation engine may perform numerous computations in parallel, in an embodiment. In an embodiment, the instructions may also specify an offset with the input memories, providing additional flexibility in the location of operands. More particularly, the computation engine may be configured to perform numerous multiplication operations in parallel and to accumulate results in a result memory, performing multiply-accumulate operations for each matrix/vector element in the targeted locations of the output memory. The computation engine may be both high performance and power efficient, in an embodiment, as compared to a general purpose processor (even one with vector instructions), for example.

BRIEF DESCRIPTION OF THE DRAWINGS

The following detailed description makes reference to the accompanying drawings, which are now briefly described.

FIG. 3 is a block diagram illustrating one embodiment of X, Y, and Z memories for the computation engine shown in FIG. 1 performing an outer product (matrix) operation.

FIG. 4 is a block diagram illustrating one embodiment of X, Y, and Z memories for the computation engine shown in FIG. 1 performing an outer product (matrix) operation using a different size operand.

FIG. 6 is table of instructions which may be used for one embodiment of the processor and computation engine.

Figure 1:
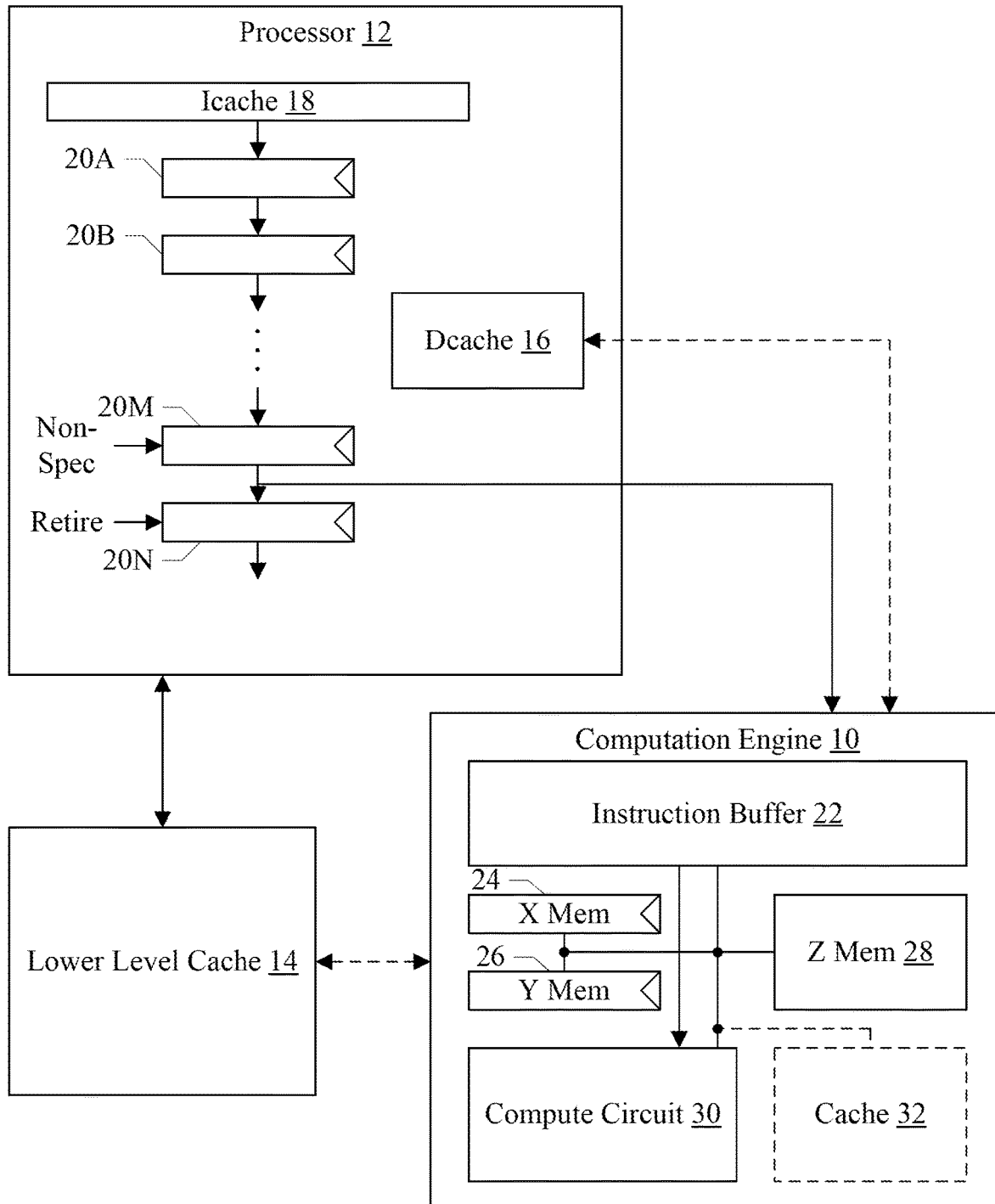
FIG. 1 is a block diagram of one embodiment of a processor, a computation engine, and a lower level cache.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Turning now to FIG. 1, a block diagram of one embodiment of an apparatus including a processor 12, a computation engine 10, and a lower level cache 14 is shown. In the illustrated embodiment, the processor 12 is coupled to the lower level cache 14 and the computation engine 10. In some embodiments, the computation engine 10 may be coupled to the lower level cache 14 as well, and/or may be coupled to a data cache (DCache) 16 in the processor 12. The processor 12 may further include an instruction cache (ICache) 18 and one or more pipeline stages 20A-20N. The pipeline stages 20A-20N may be coupled in series. The computation engine 10 may include an instruction buffer 22, an X memory 24, a Y memory 26, a Z memory 28, and a compute circuit 30 coupled to each other. In some embodiments, the computation engine 10 may include a cache 32.

The computation engine 10 may be configured to perform one or more matrix operations (outer product operations) and one or more vector operations. Specifically, in an embodiment, the computation engine 10 may perform integer and floating point multiplications. For example, an embodiment receives input vectors (e.g. in the X memory 24 and the Y memory 26). The compute circuit 30 may include an array of compute elements (circuits). Each compute element may receive selected vector elements in the X memory 24 and the Y memory 26 and may multiply those values. Additionally, the compute element may receive the current value of a destination location in the Z memory 28 and may sum the current value with the multiplication result to generate the result for the Z memory 28 (thus accumulating the multiplication result with previous results).

In matrix mode, each vector element from the X memory 24 is multiplied by each of the vector elements from the Y memory 24 to generate the matrix elements for the output matrix. Specifically, input vectors may be loaded into the X memory 24 and the Y memory 26, and a compute instruction may be executed by the computation engine. In response to the compute instruction (and particularly the compute instruction being coded for the matrix mode), the computation engine 10 may perform the outer product operation and write the resulting outer product matrix to the Z memory 28. If the vector loaded into the X memory 24 ("X vector") has a first number of vector elements and the vector loaded into the Y memory 26 ("Y vector") has a second number of vector elements, the resulting matrix is a [first number]× [second number] matrix, where each entry (or element) in the matrix (element i, j) is the product of corresponding vector elements X(i) and Y(j). In an embodiment, the first number and second number are equal, and the matrix is a square matrix. Other embodiments may implement non-square matrices, or different outer product operations may produce square or non-square results based on the input vector elements.

In an embodiment, the computation engine 10 may perform outer product operations along with accumulating the result matrix with previous results in the Z memory 28 (where the accumulation may be adding or subtracting). That is, the outer product instruction may be a fused multiply-add (FMA) operation defined to multiply elements of the X vector by elements of the Y vector and add the products to corresponding elements of the Z matrix, or a fused multiply-subtract (FMS) operation defined to multiply elements of the X vector by elements of the Y vector and subtract the products from corresponding elements of the Z matrix. Alternatively, the FMS operation may include subtracting the corresponding elements of the Z matrix from the products. In an embodiment, the FMA and FMS may operate on floating point vector elements. A MAC compute instruction may also be supported for integer vector elements.

Furthermore, the compute instructions (FMA, FMS, and MAC) may be code for a vector mode. In the vector mode, a vector multiplication may be performed (e.g. each vector element in one vector may be multiplied by the corresponding vector element in the other vector). The results may be accumulated with current values in the Z memory 28, at a targeted entry of the Z memory 28. That is, in vector mode, a single entry (or row) of the Z memory 28 may be updated in vector mode, as opposed to multiple entries (rows) representing a matrix as is updated in the matrix mode.

Accordingly, each instruction may be coded for the desired mode (vector or matrix) and the instructions of different modes may be intermixed in a stream of computation instructions provided to the computation engine 10. That is, the computation engine 10 may not itself have a vector mode or matrix mode (programmed in a control register, for example), and instead may operate in either mode on an instruction-by-instruction basis. Flexibility and performance may be enhanced using an instruction-by-instruction mode selection, in some embodiments.

Additionally, the computation engine 10 may be configured to read operands from any offset within the X memory 24 and/or the Y memory 26. The operands may be selected with a register address identifying the entry in the memory 24 or 26 from which operands are to be read, and an offset into that entry. The initial operand element (vector element) may be selected from the offset, and additional vector elements may be read from adjacent locations in the entry until the end of the entry is reached. The computation engine 10 may complete the vector by reading additional vector elements/from the beginning of the next entry (the register address plus one). Thus, the data to be operated upon may be "misaligned" in the entries, and the correct data for a given operation may be read without moving data around in the memories 24 and 26. Such operation may be useful, e.g., if the operations to be performed use partially overlapping data.

In an embodiment, the vector elements may be 8 or 16 bit integers or 16, 32, or 64 bit floating point numbers. Thus, a 64 bit field in the X memory 24 or the Y memory 26 may include four 16 bit integer or eight 8 bit integers. Similarly, a 64 bit field in the X memory 24 or the Y memory 26 may include four 16 bit floating point numbers, two 32 bit floating point numbers, or one 64 bit floating point number.

As mentioned previously, the compute circuit 30 may be an array of compute elements, not only to perform the multiplications and additions that generate the elements for one result matrix element or result vector element, but also to perform multiplications for multiple matrix/vector elements in parallel. For example, if the X memory 24 and the Y memory 26 include 512 bit entries and 8 bit vector elements are implemented, 64 vector elements input matrices are stored in each entry of the X memory 24 and the Y memory 26 and may be processed in parallel in response to one compute instruction. Similarly, if 1024 bit entries are supported per entry of the memory, 128 vector elements may be processed in parallel. If 128 bit entries are supported, 16 vector elements may be processed in parallel. If 256 bit entries are supported, 32 vector elements may be processed in parallel. Alternatively, the compute circuit 30 may include a smaller number of MACs than would be used to perform all the matrix/vector element multiplications in the input operands in parallel. In such an embodiment, the computation engine 10 may use multiple passes through the compute circuit 30 for different portions of input data from the X memory 24 and the Y memory 26 to complete one array of matrix computations.

As mentioned above, the computation engine 10 may support multiple sizes of matrix/vector elements in the accumulated results, in one embodiment. For example, 16 bit result elements and 32 bit result elements may be supported for 16 bit input elements. For 32 bit input elements, 32 bit or 64 bit elements may be supported. The maximum number of result elements in the Z memory 28 may be set by the size of the Z memory 28 and the size of the accumulated element for a given operation. Smaller sizes may consume less memory in the Z memory 28. For matrix operations, the Z memory 28 may be arranged to write the smaller matrix elements in certain entries of the memory, leaving other entries unused (or unmodified). For example, if the matrix elements are ½ the size of the largest elements, every other entry in the Z memory 28 may be unused. If the matrix elements are ¼ the maximum size element, every fourth row may be used, etc. In an embodiment, the Z memory 28 may be viewed as having multiple banks, where the entries in the Z memory 28 are spread across the banks (e.g. even addressed entries may be in bank 0, and odd addressed entries may be in bank 1, for a two bank embodiment). Every fourth entry may be in a different bank if there are four banks (e.g. entries 0, 4, 8, etc. may be in bank 0, entries 1, 5, 9, etc. may be in bank 1, and so forth). Vector results may consume one row of the Z memory 28, as mentioned previously.

In an embodiment, the instructions executed by the computation engine 10 may also include memory instructions (e.g. load/store instructions). The load instructions may transfer vectors/matrices from a system memory (not shown in FIG. 1) to the X memory 24, Y Memory 26, or Z memory 28. The store instructions may write the matrices/vectors from the Z memory 28 to the system memory. Some embodiments may also include store instructions to write matrices/vectors from the X and Y memories 24 and 26 to system memory. The system memory may be a memory accessed at a bottom of the cache hierarchy that includes the caches 14, 16, and 18. The system memory may be formed from a random access memory (RAM) such as various types of dynamic RAM (DRAM) or static RAM (SRAM). A memory controller may be included to interface to the system memory. In an embodiment, the computation engine 10 may be cache coherent with the processor 12. In an embodiment, the computation engine 10 may have access to the data cache 16 to read/write data. Alternatively, the computation engine 10 may have access to the lower level cache 14 instead, and the lower level cache 14 may ensure cache coherency with the data cache 16. In yet another alternative, the computation engine 10 may have access to the memory system, and a coherence point in the memory system may ensure the coherency of the accesses. In yet another alternative, the computation engine 10 may have access to the caches 14 and 16.

In some embodiments, the computation engine 10 may include a cache 32 to store data recently accessed by the computation engine 10. The choice of whether or not to include cache 32 may be based on the effective latency experienced by the computation engine 10 and the desired level of performance for the computation engine 10. The cache 32 may have any capacity, cache line size, and configuration (e.g. set associative, direct mapped, etc.).

In the illustrated embodiment, the processor 12 is responsible for fetching the computation engine instructions (e.g. compute instructions, memory instructions, etc.) and transmitting the computation engine instructions to the computation engine 10 for execution. The overhead of the "front end" of the processor 12 fetching, decoding, etc. the computation engine instructions may be amortized over the matrix/vector computations performed by the computation engine 10. In one embodiment, the processor 12 may be configured to propagate the computation engine instruction down the pipeline (illustrated generally in FIG. 1 as stages 20A-20N) to the point at which the computation engine instruction becomes non-speculative. In FIG. 1, the stage 20M illustrates the non-speculative stage of the pipeline. From the non-speculative stage, the instruction may be transmitted to the computation engine 10. The processor 12 may then retire the instruction (stage 20N). Particularly, the processor 12 may retire the instruction prior to the computation engine 10 completing the instruction (or even prior to starting the instruction, if the instruction is queued behind other instructions in the instruction buffer 22).

Generally, an instruction may be non-speculative if it is known that the instruction is going to complete execution without exception/interrupt. Thus, an instruction may be non-speculative once prior instructions (in program order) have been processed to the point that the prior instructions are known to not cause exceptions/speculative flushes in the processor 12 and the instruction itself is also known not to cause an exception/speculative flush. Some instructions may be known not to cause exceptions based on the instruction set architecture implemented by the processor 12 and may also not cause speculative flushes. Once the other prior instructions have been determined to be exception-free and flush-free, such instructions are also exception-free and flush-free.

In the case of memory instructions that are to be transmitted to the computation engine 10, the processing in the processor 12 may include translating the virtual address of the memory operation to a physical address (including performing any protection checks and ensuring that the memory instruction has a valid translation).

FIG. 1 illustrates a communication path between the processor 12 (specifically the non-speculative stage 20M) and the computation engine 10. The path may be a dedicated communication path, for example if the computation engine 10 is physically located near the processor 12. The communication path may be shared with other communications, for example a packet-based communication system could be used to transmit memory requests to the system memory and instructions to the computation engine 10. The communication path could also be through system memory, for example the computation engine may have a pointer to a memory region into which the processor 12 may write outer product instructions.

The instruction buffer 22 may be provided to allow the computation engine 10 to queue instructions while other instructions are being performed. In an embodiment, the instruction buffer 22 may be a first in, first out buffer (FIFO). That is, computation engine instructions may be processed in program order. Other embodiments may implement other types of buffers, multiple buffers for different types of instructions (e.g. load/store instructions versus compute instructions) and/or may permit out of order processing of instructions.

The X memory 24 and the Y memory 26 may each be configured to store at least one vector of matrices or vector elements defined for the computation engine instructions (e.g. 8, 16, 32, 64, etc. matrices of 8 bit matrix elements and 2×2 matrices). Similarly, the Z memory 28 may be configured to store at least one matrix computation result. The result may be an array of matrices at the result size (e.g. 16 bit matrix elements or 32 bit matrix elements). In some embodiments, the X memory 24 and the Y memory 26 may be configured to store multiple vectors of matrices and/or the Z memory 28 may be configured to store multiple result vectors of matrices. Each vector of matrices may be stored in a different bank in the memories, and operands for a given instruction may be identified by bank number. More generally, each entry in the memories 24, 26, and 28 may be addressed by a register address (e.g. register number) and thus the entries in the memories may be viewed as registers, similar to an integer or floating point register in the processor 12 (although generally significantly larger than such a register in terms of storage capacity).

The processor 12 fetches instructions from the instruction cache (ICache) 18 and processes the instructions through the various pipeline stages 20A-20N. The pipeline is generalized, and may include any level of complexity and performance enhancing features in various embodiments. For example, the processor 12 may be superscalar and one or more pipeline stages may be configured to process multiple instructions at once. The pipeline may vary in length for different types of instructions (e.g. ALU instructions may have schedule, execute, and writeback stages while memory instructions may have schedule, address generation, translation/cache access, data forwarding, and miss processing stages). Stages may include branch prediction, register renaming, prefetching, etc.

Generally, there may be a point in the processing of each instruction at which the instruction becomes non-speculative. The pipeline stage 20M may represent this stage for computation engine instructions, which are transmitted from the non-speculative stage to the computation engine 10. The retirement stage 20N may represent the state at which a given instructions results are committed to architectural state and can no longer by "undone" by flushing the instruction or reissuing the instruction. The instruction itself exits the processor at the retirement stage, in terms of the presently-executing instructions (e.g. the instruction may still be stored in the instruction cache). Thus, in the illustrated embodiment, retirement of a computation engine instruction occurs when the instruction has been successfully transmitted to the computation engine 10.

The instruction cache 18 and data cache (DCache) 16 may each be a cache having any desired capacity, cache line size, and configuration. Similarly, the lower level cache 14 may be any capacity, cache line size, and configuration. The lower level cache 14 may be any level in the cache hierarchy (e.g. the last level cache (LLC) for the processor 12, or any intermediate cache level).

Figure 2:
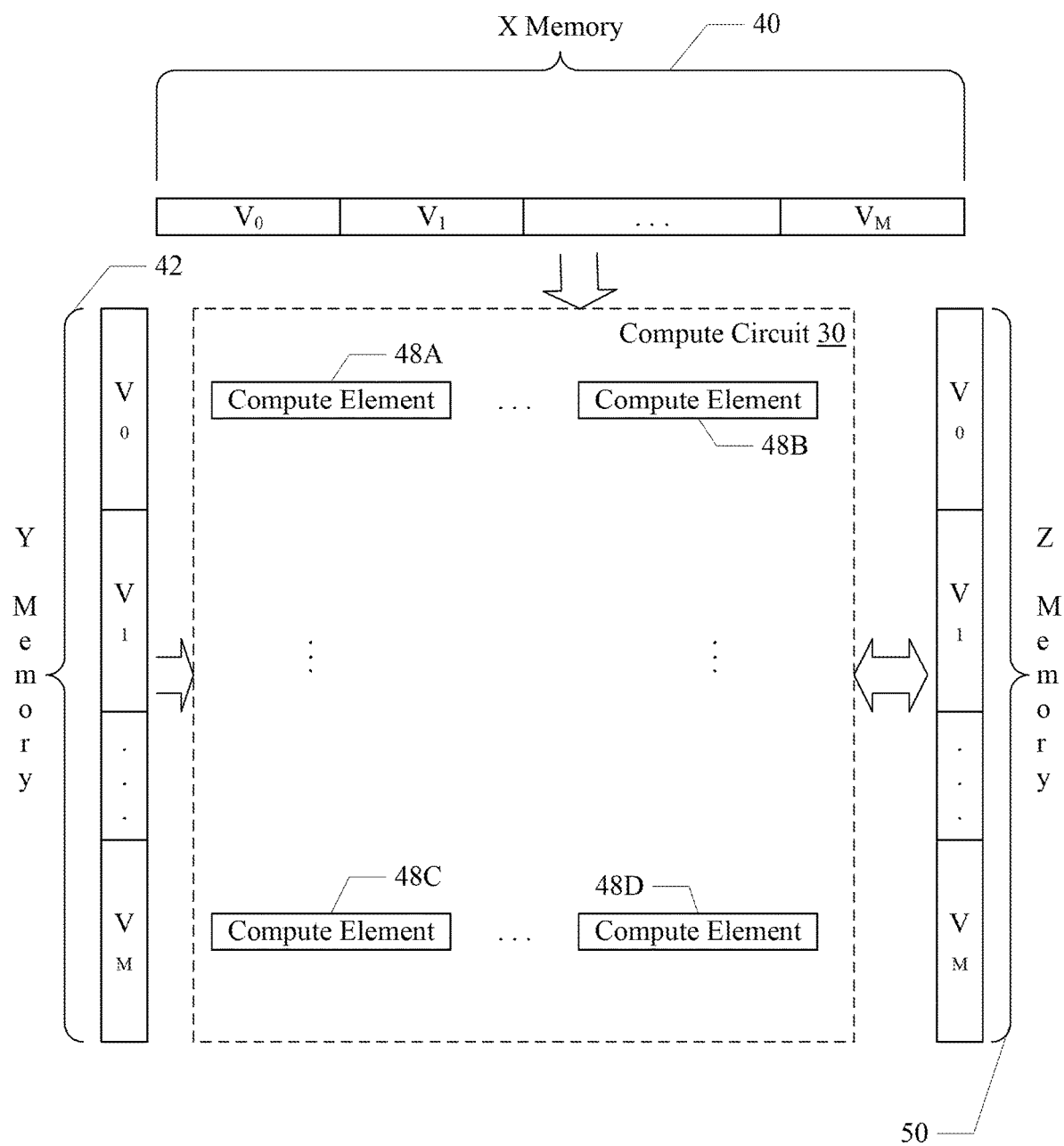
FIG. 2 is a block diagram illustrating one embodiment of X, Y, and Z memories and a compute circuit for the computation engine shown in FIG. 1 in a vector mode.

FIG. 2 is a block diagram illustrating an entry of the X memory 24 (brace 40), an entry of the Y memory 26 (brace 42), the compute circuit 30, and an entry of the Z memory 28 (brace 50) is shown when executing a compute instruction in vector mode in an embodiment.

In FIG. 2, the X memory entry 40 includes vector elements $V_0$ to $V_M$, and the Y memory entry 42 similarly includes vector elements $V_0$ to $V_M$. The Z memory entry 50 may also include vector elements $V_0$ to $V_M$. Each vector element in the X memory entry 40 may be multiplied by the corresponding vector element in the Y memory entry 42 and the result may be accumulated in the corresponding vector element of the Z memory entry 50. Thus, the Z memory entry 50 may be the same size as the X memory entry 40 and/or the Y memory entry 42. Alternatively, if the results are accumulated at a larger size than the input vector element size, more Z memory may be occupied by the results than the input memory, by a ratio of the sizes. In another alternative, fewer vector elements may be selected from the X memory entry 40 and the Y memory entry 42 by a ratio of the sizes. For example, if results are accumulated at twice the size of the input vector elements, every other vector element may be operated on.

In vector mode, the compute elements 48A-48D may perform the multiplications and accumulation with the current element in the Z memory entry 50. It is noted that, while the vector elements may be viewed as a single vector with M+1 elements, the vector elements may also be multiple vectors of fewer elements, all in one entry. The operation of the compute circuit 30 may be the same in either case.

As mentioned above in the discussion of FIG. 1, in an embodiment, the matrix/vector elements to be operated on may be read from offsets in the X and Y memories 24 and 26. The offsets need not be the same for the two memories for the same operation, in an embodiment. In another embodiment, the same offset may be used for both memories to reduce the amount of coding in the instruction. An example of the operation of the offsets for one embodiment is described in further detail below with regard to FIG. 5.

The compute instructions supported in the computation engine may include fused multiply add (FMA), fused multiply subtract (FMS) and multiply accumulate (MAC). FMA and FMS may operate on floating point elements (e.g. 16 bit, 32 bit, or 64 bit elements). FMA may compute $Z=Z+X*Y$, whereas FMS may compute $Z=Z-X*Y$. MAC may operate on integer operands (e.g. 8 bit or 16 bit integer operands) and may compute $Z=Z+X*Y$. In an embodiment, the MAC may support an optional right shift of the multiplication result before accumulating the result with Z.

Figure 3:
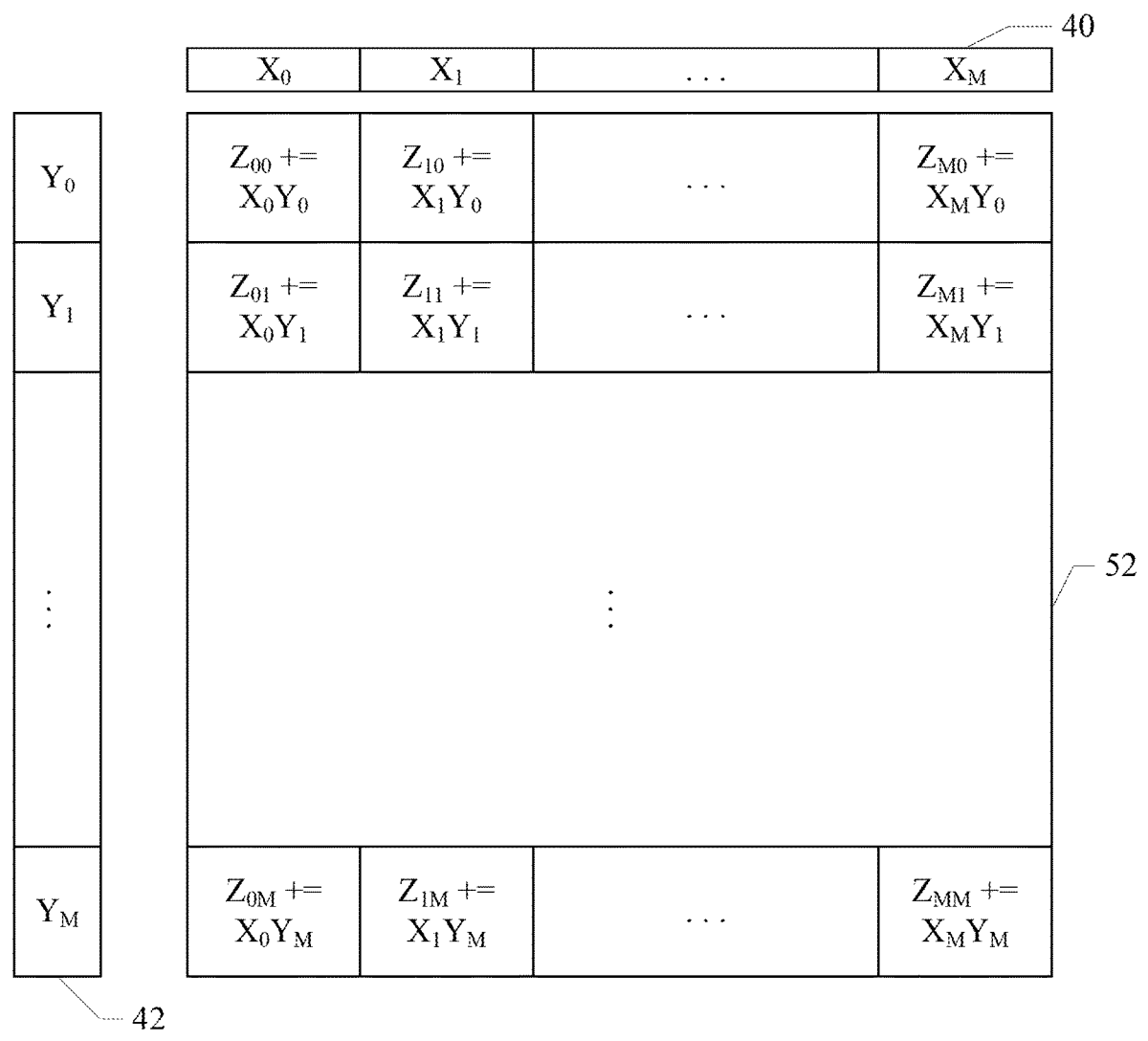

FIG. 3 is a block diagram illustrating vectors from an entry of the X memory 24 and the Y memory 26 (reference numerals 40 and 42) and a result matrix 52. The X elements are labeled $X_0$ to $X_M$, and the Y elements are labeled $Y_0$ to $Y_M$ so that the elements may be distinguished in the result matrix 52. The X elements and Y elements may be instances of the vector elements $V_0$ to $V_M$ as shown previously. The matrix elements are labeled $Z_{00}$ to $Z_{MM}$, wherein the first digit is the X element number of the element that is included in the product and the second digit is the Y element number of the element that is included in the product. Thus, each row of the matrix 52 in FIG. 3 corresponds to a particular Y vector element, and each column of the matrix 52 in FIG. 3 corresponds to a particular X vector element. Each entry in the matrix 52 may be filled with an element when a matrix mode compute instruction has been executed, summing the preceding value in the entry with the product of vector elements as shown (e.g. $Z_{00}+=X_0Y_0$).

FIG. 4 illustrates two examples of the X and Y vectors 40 and 42 and the result matrix 52. In the first example, X and Y vectors 40a and 42a have elements 0 to M, which may be the minimum supported size of the vector element sizes. The results are thus filled in as $Z_{00}$ to $Z_{MM}$, similar to the illustration of FIG. 3 (reference numeral 52a). In the second example, the X and Y vectors 40b and 42b have elements that are twice the minimum supported element size. Thus, the X and Y vectors have vector elements 0 to N, where N is the integer portion of M/2 plus one, as shown at the bottom of FIG. 4. The result matrix 52b has fewer values in it because there are fewer products. In an embodiment, each other row in the result matrix 52b is not used when the vector elements are twice the minimum supported size. Even fewer rows would be used for vector elements that are four times the minimum, and still fewer as the size continues to increase.

As previously discussed, the Z memory 28 may be divided into banks, where the unused rows for each different size of vector elements may be allocated to the same bank, so that only ½ of the banks may be updated when twice the minimum size vector elements are used, ¼ of the banks may be updated when four times the minimum size vector elements are used, etc.

Figure 5:
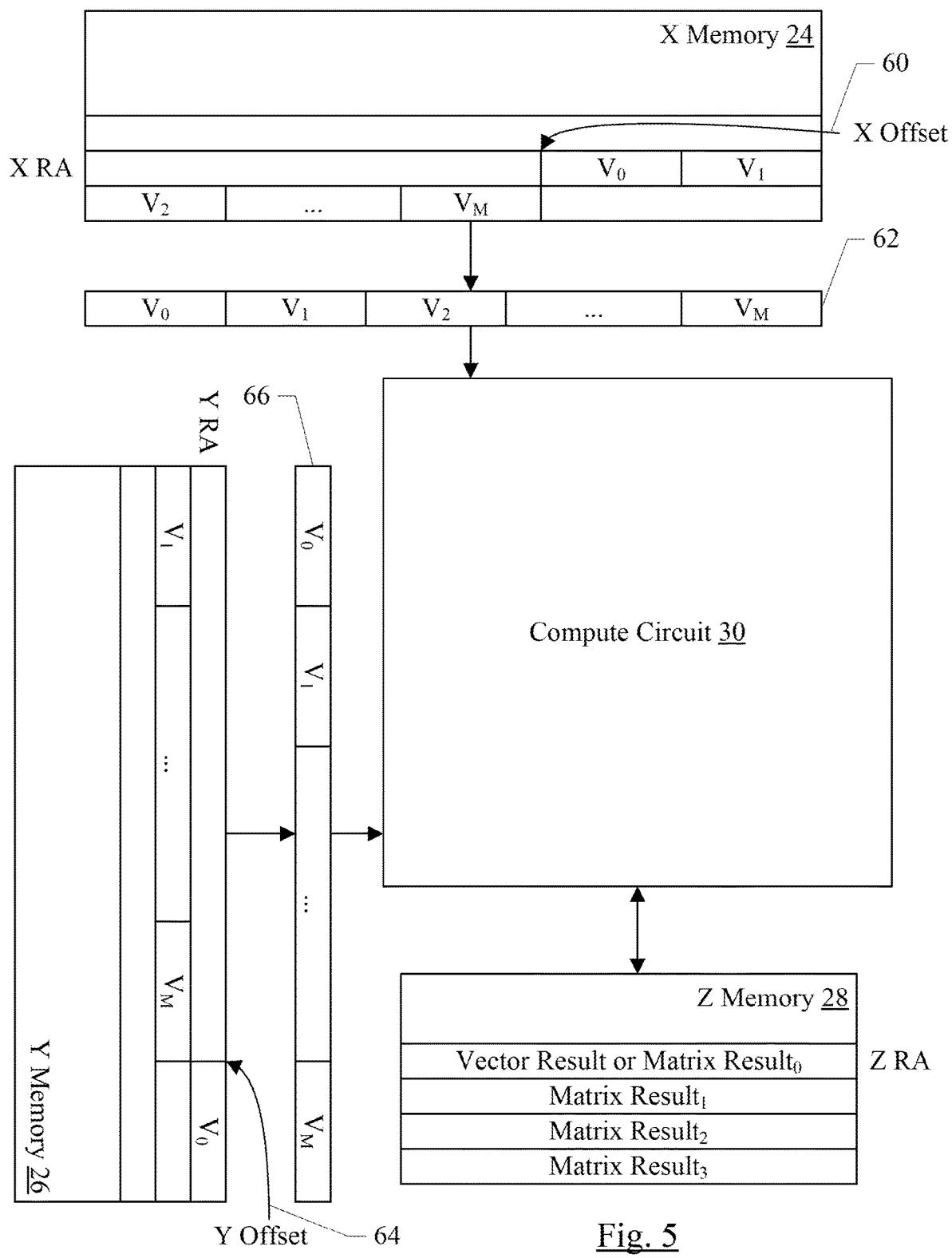
FIG. 5 is a block diagram illustrating register address and offset support for one embodiment of the computation engine shown in FIG. 1.

FIG. 5 is a block diagram illustrating the use of offsets for an embodiment. The X memory 24 is illustrated at the top of FIG. 5, and the Y memory 26 is illustrated at the left. Each memory has multiple entries. An entry is illustrated as a row in each of the memories 24 and 26, and may be selected using an entry number or register address (RA) coded into the compute instruction that is being executed. An offset may also be coded, which selects a byte within the entry to be the initial vector element read from the memory.

Thus, the X memory 24 in FIG. 5 is accessed at the entry identified by X RA, and the X offset (arrow 60) points to the initial element $V_0$. In the example shown in FIG. 5, the first two elements are in the selected entry. The remaining elements $V_2$ to $V_M$ are accessed from the next consecutive entry, providing a full entry of data. The elements may be aligned upon read from the memory so that the elements are in order entering the compute circuit 30 (reference numeral 62). Alternatively, the elements may remain in the relative locations from which they were read within the entry and next consecutive entry, in another embodiment. The example in FIG. 5 illustrates a non-zero X offset. If a zero offset were provided, then vector elements $V_0$ to $V_M$ may be read from a single entry.

Similarly, the Y memory 26 is accessed at the entry identified by Y RA, and the Y offset (arrow 64) may point to the initial element $V_0$. In the example shown in FIG. 5, the first element is in the selected entry. The remaining elements $V_1$ to $V_M$ are accessed from the next consecutive entry, providing a full entry of data. The elements may be aligned upon read from the memory so that the elements are in order entering the compute circuit 30 (reference numeral 66). Alternatively, the elements may remain in the relative locations from which they were read within the entry and next consecutive entry, in another embodiment. The ordering of elements when the offset is used may be the same as that used for the X memory 24, in an embodiment (i.e. elements from both memories may be aligned as shown at reference numerals 62 and 66, or elements from both memories may remain in their respective positions). The example in FIG. 5 illustrates a non-zero Y offset. If a zero offset were provided, then vector elements $V_0$ to $V_M$ may be read from a single entry.

Also shown in FIG. 5 is the Z memory 28. An entry in the Z memory 28 may be selected in the Z memory 28 based on a Z register address (Z RA). The vector result may be stored in this entry. A matrix result may be stored in the entry (Matrix Result$_0$) along with multiple adjacent entries (Matrix Result$_1$, Matrix Result$_2$, and Matrix Result$_3$). As mentioned previously, when smaller element sizes are used, not all of the space in the matrix result may be written.

FIG. 6 is a table 90 illustrating an exemplary instruction set for one embodiment of the computation engine 10. Other embodiments may implement any set of instructions, including subsets of the illustrated set, other instructions, a combination of subsets and other instructions, etc.

The memory operations may include load and store instructions. Specifically, in the illustrated embodiment, there are load and store instructions for the X, Y, and Z memories, respectively. In the case of the Z memory 28, a size parameter may indicate which matrix element size is being used (for matrix mode) and thus which rows of the Z memory are written to memory or read from memory (e.g. all rows, every other row, ever fourth row, etc.). In an embodiment, the X and Y memories may have multiple banks for storing different matrices/vectors. In such an embodiment, there may be multiple instructions to read/write the different banks or there may be an operand specifying the bank affected by the load/store X/Y instructions. In each case, an X memory bank may store a pointer to memory from/to which the load/store is performed. The pointer may be virtual, and may be translated by the processor 12 as discussed above. Alternatively, the pointer may be physical and may be provided by the processor 12 post-translation.

The compute instructions may perform a vector multiplication or matrix mode (outer product) operation, depending on the mode of the instruction (V/M in FIG. 6). As previously discussed, the compute instructions may include the FMA and FMS instructions for floating point elements and the MAC instruction for integer elements. The size parameter may indicate the size of the elements and/or the size of the result elements (if such elements are larger). The compute instructions may include X RA and offset fields, Y RA and offset fields, and the Z RA field.

In an embodiment, the FMA, FMS, and MAC instructions may further include variations the modify the operation being performed. The basic operation may be Z=Z+/−X*Y, but subsets of the operation may be performed in which there is no accumulation (Z=+/−X*Y), where X or Y is added to Z without multiplication (Z=Z+/−X, Z=Z+/−Y), clear (Z=0), and no-operation (NOP) (Z=Z).

In an embodiment, the compute instructions may support masking, where one or more elements may not be computed and stored in the Z memory 28. In such embodiments, the compute elements 48A-48D corresponding to the masked elements may be inactive during the operation, which may reduce power consumption. For example, there are some cases in which only even or odd numbered rows or columns of the result matrix may be updated (e.g. for complex numbers). In another case, restrict computations to the first N rows or columns may be desired (when the edges/corners of the matrices are reached, for example.). In matrix mode. the intersection of the X and Y masks may define a Z mask. In vector mode, only the X mask may be used. Masked elements of the Z memory 28 may not be updated.

Figure 7:
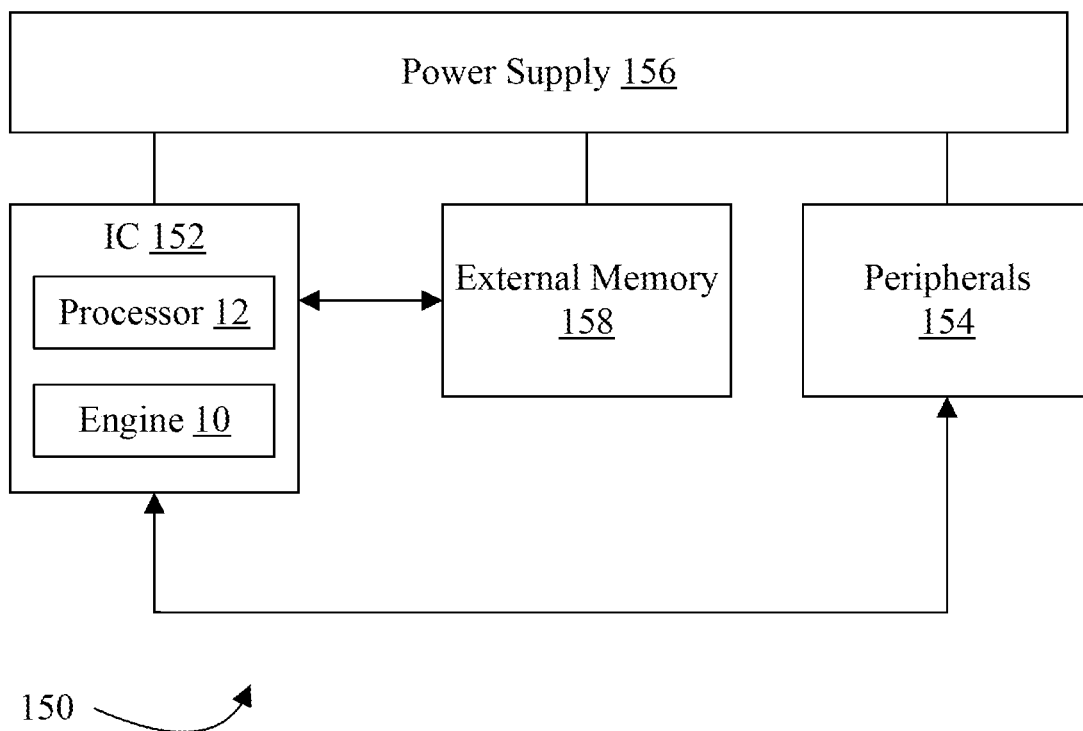
FIG. 7 is a block diagram of one embodiment of a system.

FIG. 7 is a block diagram of one embodiment of a system 150. In the illustrated embodiment, the system 150 includes at least one instance of an integrated circuit (IC) 152 coupled to one or more peripherals 154 and an external memory 158. A power supply 156 is provided which supplies the supply voltages to the IC 152 as well as one or more supply voltages to the memory 158 and/or the peripherals 154. The IC 152 may include one or more instances of the processor 12 and one or more instances of the computation engine 10. In other embodiments, multiple ICs may be provided with instances of the processor 12 and/or the computation engine 10 on them.

The peripherals 154 may include any desired circuitry, depending on the type of system 150. For example, in one embodiment, the system 150 may be a computing device (e.g., personal computer, laptop computer, etc.), a mobile device (e.g., personal digital assistant (PDA), smart phone, tablet, etc.), or an application specific computing device capable of benefitting from the computation engine 10 (e.g., neural networks, LSTM networks, other machine learning engines including devices that implement machine learning, etc.). In various embodiments of the system 150, the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the IC 152 in a chip-on-chip or package-on-package implementation.

Figure 8:
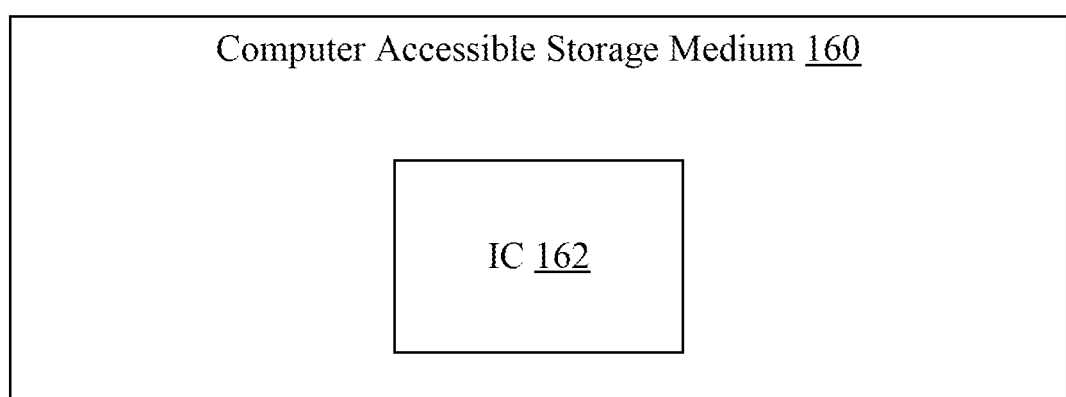
FIG. 8 is a block diagram of one embodiment of a computer accessible storage medium.

FIG. 8 is a block diagram of one embodiment of a computer accessible storage medium 160 storing an electronic description of the IC 152 (reference numeral 162) is shown. More particularly, the description may include at least the computation engine 10 and/or the processor 12. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 160 may store data in a non-transitory manner, where non-transitory in this context may refer to not transmitting the instructions/data on a signal. For example, non-transitory storage may be volatile (and may lose the stored instructions/data in response to a power down) or non-volatile.

Generally, the electronic description 162 of the IC 152 stored on the computer accessible storage medium 160 may be a database which can be read by a program and used, directly or indirectly, to fabricate the hardware comprising the IC 152. For example, the description may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the IC 152. The netlist may then be placed and routed to produce a data set describing geometric shapes to be applied to masks. The masks may then be used in various semiconductor fabrication steps to produce a semiconductor circuit or circuits corresponding to the IC 152. Alternatively, the description 162 on the computer accessible storage medium 300 may be the netlist (with or without the synthesis library) or the data set, as desired.

While the computer accessible storage medium 160 stores a description 162 of the IC 152, other embodiments may store a description 162 of any portion of the IC 152, as desired (e.g. the computation engine 10 and/or the processor 12, as mentioned above).

Numerous variations and modifications will become apparent to those skilled in the art once the above disclosure is fully appreciated. It is intended that the following claims be interpreted to embrace all such variations and modifications.

What is claimed is:

1. An apparatus comprising:
   a processor configured to fetch a compute instruction; and
   a computation engine coupled to the processor, wherein:
      the processor is configured to transmit the compute instruction to the computation engine;
      the compute instruction is coded with a vector/matrix mode selection;
      the computation engine is configured to perform a matrix multiplication operation in response to the compute instruction and the vector/matrix mode selection coded to a matrix mode;
      the computation engine is configured to perform a vector multiplication operation in response to the compute instruction and the vector/matrix mode selection coded to a vector mode; and
      the computation engine comprises a compute circuit having a plurality of compute elements, wherein a given compute element of the plurality of compute elements is configured to generate one matrix element in the matrix mode, and wherein the given compute element is configured to generate one vector element in the vector mode.

2. The apparatus as recited in claim 1 wherein the computation engine comprises at least a first input memory and a second input memory, wherein a first operand of the compute instruction is provided from the first input memory and a second operand of the compute instruction is provided from the second input memory.

3. The apparatus as recited in claim 2 wherein the compute circuit is configured to perform multiplications on a first plurality of vector elements within the first operand and a second plurality of vector elements within the second operand to generate a first plurality of result matrix elements in the matrix mode.

4. The apparatus as recited in claim 3 wherein the compute instruction is further coded with a mask that defines which result matrix elements are to be updated.

5. The apparatus as recited in claim 4 wherein, in the matrix mode, the mask comprises a first mask for the first operand and a second mask for the second operand, and an intersection of first mask and the second mask defines the mask.

6. The apparatus as recited in claim 5 wherein, in the vector mode, one mask is provided.

7. The apparatus as recited in claim 2 wherein the compute instruction is further coded with a first address and a first offset corresponding to the first input memory, and wherein an initial element of the first operand is located at the first offset in a first entry of the first input memory that is identified by the first address, and wherein remaining elements of the first operand are located in a portion of the first entry and a second entry adjacent to the first entry in the first input memory if the first offset is non-zero.

8. The apparatus as recited in claim 7 wherein the compute instruction is further coded with a second address and a second offset corresponding to the second input memory, and wherein the initial element of the second operand is located at the second offset in a third entry of the second input memory that is identified by the second address, and wherein remaining elements of the second operand are located in a portion of the third entry and a fourth entry adjacent to the third entry in the second input memory if the second offset is non-zero.

9. The apparatus as recited in claim 8 wherein the first offset and the second offset are separate and codable to different values.

10. A computation engine configured to execute a compute instruction, the computation engine comprising:
    a circuit configured to perform a matrix multiplication operation on a first operand and a second operand responsive to a vector/matrix mode selection coded into the compute instruction indicating a matrix mode, producing a result matrix, and the circuit configured to perform a vector multiplication operation on the first operand and the second operand responsive to the vector/matrix mode selection indicating a vector mode, producing a result vector;
    a first memory coupled to the circuit, wherein the first memory is configured to store the first operand;
    a second memory coupled to the circuit, wherein the second memory is configured to store the second operand; and
    a third memory coupled to the circuit, wherein the third memory is configured to store the result vector or the result matrix from the circuit, wherein the third memory comprises a plurality of entries, and wherein the circuit is configured to write the result vector to a single entry of the plurality of entries, and wherein the circuit is configured to write the result matrix to a plurality of the plurality of entries, wherein the plurality of the plurality of entries includes the single entry, and wherein computation engine is configured to generate results having a plurality of sizes, and wherein the computation engine is configured to include space between the plurality of entries when the result matrix has a size less than a largest size of the plurality of sizes.

11. The computation engine as recited in claim 10 wherein the third memory is further configured to provide a current value to the circuit, wherein the circuit is configured to accumulate the current value and a second result of the vector multiplication operation or the matrix multiplication operation to generate the result vector or the result matrix to store in the third memory.

12. The computation engine as recited in claim 11 wherein the accumulation is addition in response to a first compute instruction and the accumulation is subtraction of the second result from the current value in response to a second compute instruction.

13. The computation engine as recited in claim 10 wherein the compute instruction is further coded with a mask that defines which result elements in the third memory are to be updated.

14. The computation engine as recited in claim 13 wherein, in the matrix mode, the mask comprises a first mask for the first operand and a second mask for the second operand, and an intersection of the first mask and the second mask defines the mask.

15. A method comprising:
    performing a matrix multiplication operation on a first operand and a second operand of a compute instruction in a computation engine responsive to a vector/matrix mode selection coded into the compute instruction indicating a matrix mode, producing a result matrix, wherein the first operand is stored in a first memory of the computation engine and the second operand is stored a second memory of the computation engine; and storing the result matrix in a plurality of entries in a third memory in the computation engine, wherein computation engine is configured to generate results having a plurality of sizes, and wherein the computation engine is configured to include space between the plurality of entries when the result matrix has a size less than a largest size of the plurality of sizes.

16. The method as recited in claim 15 further comprising:
providing a current value from the third memory; and
accumulating the current value and a second result of the matrix multiplication operation to generate the result matrix to store in the third memory.

17. The method as recited in claim 16 wherein the accumulation is addition.

18. The method as recited in claim 16 wherein the accumulation is subtraction.

19. The method as recited in claim 15 wherein the compute instruction is further coded with a mask that defines which result elements in the third memory are to be updated.

20. The method as recited in claim 19 wherein, in the matrix mode, the mask comprises a first mask for the first operand and a second mask for the second operand, and an intersection of the first mask and the second mask defines the mask.

* * * * *